United States Patent [19]
Inaba

[11] Patent Number: 5,132,817
[45] Date of Patent: Jul. 21, 1992

[54] DISPLAY HAVING A PRINTING FUNCTION

[75] Inventor: Yutaka Inaba, Kawaguchi, Japan

[73] Assignee: Canon Kabushiki Kaisha, Tokyo, Japan

[21] Appl. No.: 359,489

[22] Filed: May 31, 1989

[30] Foreign Application Priority Data

Jun. 1, 1988 [JP] Japan ................................ 63-135906

[51] Int. Cl.⁵ .............................................. G02F 1/13
[52] U.S. Cl. ...................................... 359/56; 359/104;
346/134; 355/271
[58] Field of Search ............... 350/332, 333, 350 S, 350/331 R; 340/784, 805; 346/134, 9; 355/76; 358/271

[56] References Cited

U.S. PATENT DOCUMENTS

| | | | |
|---|---|---|---|
| 4,581,618 | 4/1986 | Watanabe et al. | 346/134 |
| 4,765,720 | 8/1988 | Toyono | 350/333 |
| 4,771,338 | 9/1988 | Fujiwara | 350/332 |
| 4,927,243 | 5/1990 | Taniguchi et al. | 350/333 |

FOREIGN PATENT DOCUMENTS

| | | | |
|---|---|---|---|
| 0032469 | 2/1982 | Japan | 355/271 |
| 0257473 | 12/1985 | Japan | 355/271 |
| 0137274 | 6/1988 | Japan | 355/271 |

Primary Examiner—Rolf Hille
Assistant Examiner—Tan Ho
Attorney, Agent, or Firm—Fitzpatrick, Cella, Harper & Scinto

[57] ABSTRACT

A display includes a matrix display panel having a first common line and a first data line intersecting to form a picture element for displaying data, with the first common line and the first data line being driven. A line recording head includes a second common line and a second data line for recording the data when the second common line and the second data line are driven. A device drives the first and second data lines by a common data-line drive circuit.

29 Claims, 9 Drawing Sheets

FIG.5(a) SCAN (COMMON) SELECTION SIGNAL

FIG.5(b) SCAN (COMMON) NON-SELECTION SIGNAL

FIG.5(c) ON DATA SIGNAL

FIG.5(d) OFF DATA SIGNAL

FIG.6(a) SCAN (COMMON) SELECTION SIGNAL

FIG.6(b) SCAN (COMMON) NON-SELECTION SIGNAL

FIG.6(c) ON DATA SIGNAL

FIG.6(d) OFF DATA SIGNAL

FIG. 7(a) SCAN (COMMON) SELECTION SIGNAL

FIG. 7(b) SCAN (COMMON) NON-SELECTION SIGNAL

FIG. 7(c) ON DATA SIGNAL

FIG. 7(d) OFF DATA SIGNAL

DISPLAY HAVING A PRINTING FUNCTION

BACKGROUND OF THE INVENTION

1. Field of the Invention

The present invention relates to a display in which a recording device is integrally provided.

2. Description of the Prior Art

Recently, flat type display panels such as liquid crystal displays and plasma displays have been widely used as displays for word processors and personal computers. The main portion of such a display is arranged in such a manner that a scanning line group and a signal line group are disposed perpendicular to each other, and picture elements are disposed in the form of a matrix at the intersections of the scanning lines and signal lines with circuits disposed around the display panel for driving each of the scanning lines and signal lines disposed around the display panel.

On the other hand, there are variable types of recording devices attached to a word processor or a personal computer such as thermal printers or ink jet printers. Line printers which print a full line simultaneously including a full multi-head have been widely used to meet the desire for high speed printing as an alternative to conventional serial printers. Line printers are exemplified by optical printers using a liquid crystal shutter array or an LED in addition to the above-described thermal printers or ink jet printers. With either of the type of printers described above, each bit of the line printing head needs a drive circuit. Thus, the cost of such a printer is high compared to a serial printer.

SUMMARY OF THE INVENTION

An object of the present invention is to provide a display device in which a recording device capable of high-speed printing is integrally provided.

In accordance with one aspect of the invention, a display comprises:
- a matrix type display panel having a first common line and a first data line intersecting to form a picture element for displaying data, where said first common line and said first data line are driven;
- a line recording head including a second common line and a second data line for recording the data when the second common line and the second data line are driven; and
- means for driving the first and second data lines with a common drive circuit.

In accordance with another aspect of the invention, a display comprises:
a. a display panel for displaying data;
b. a line recording head for recording data;
c. matrix electrodes having a plurality of scanning lines and data lines intersecting in a matrix manner and including (a) recording scanning lines comprising at least one of said plurality of scanning lines disposed on the line recording head, wherein the data is recorded by selectively driving the recording scanning lines and the data lines and (b) display scanning lines comprising the remaining scanning lines disposed on the display panel, wherein the data is displayed by selectively driving the display scanning lines and the data lines; and
d. means for applying a scanning selection signal exclusively to either the display scanning lines or the recording scanning lines either to display the data on to record it.

DESCRIPTION OF THE PREFERRED EMBODIMENTS

Embodiments of the present invention will be described with reference to the drawings.

Figure 1:
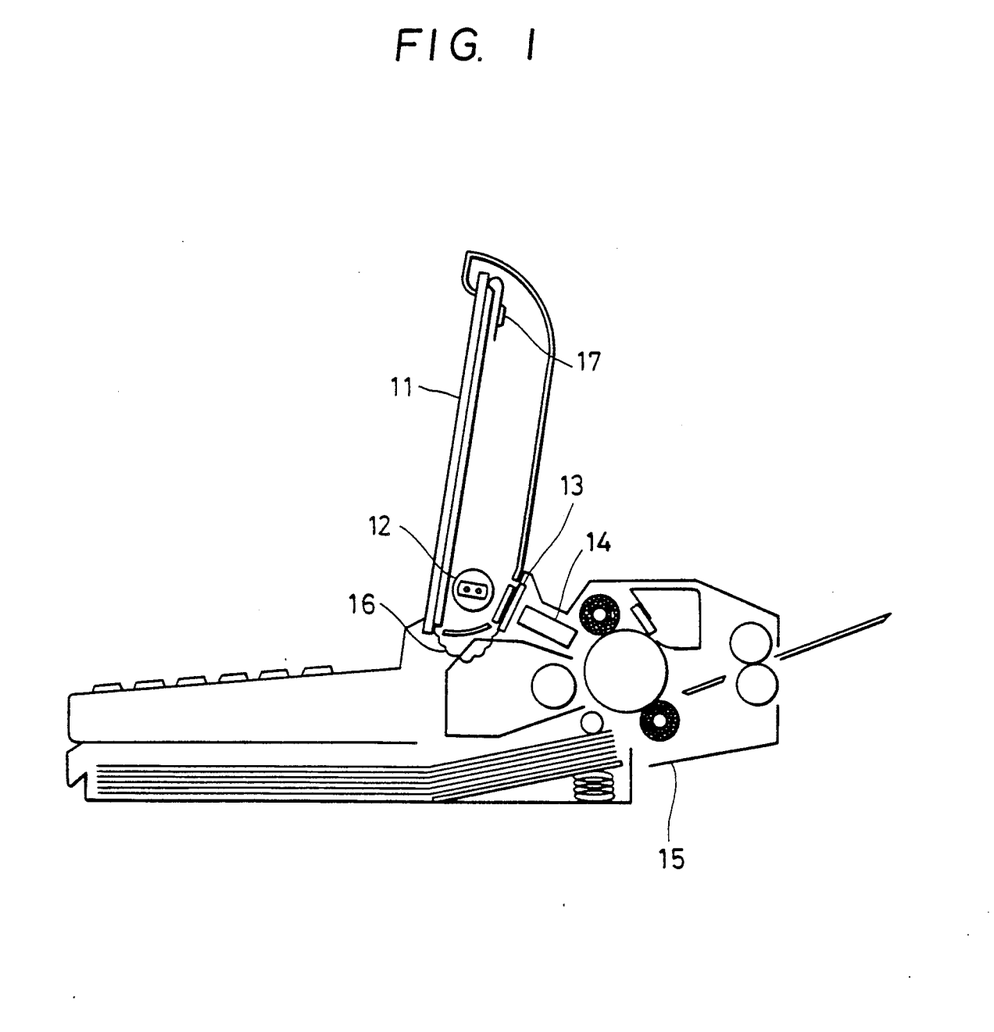
FIG. 1 is a cross-sectional view of a device according to the present invention.

FIG. 1 is a cross-sectional view of a first embodiment of a device in which a display portion and a recording portion are integrally provided in accordance with the present invention. Reference numeral 11 represents a reflection type liquid crystal display panel, 12 a fluorescent light source, 13 a liquid crystal shutter array, 14 a lens array, and 15 an electrostatic recording portion including a photosensitive body, developing device, transferring device, and fixing device. The liquid crystal panel 11 and the shutter array 13, or line recording head, are connected to each other by a flexible cable 16 and arranged to use a common data line (omitted from illustration). The data line is arranged to be driven by a data-line drive circuit 17.

Figure 2:
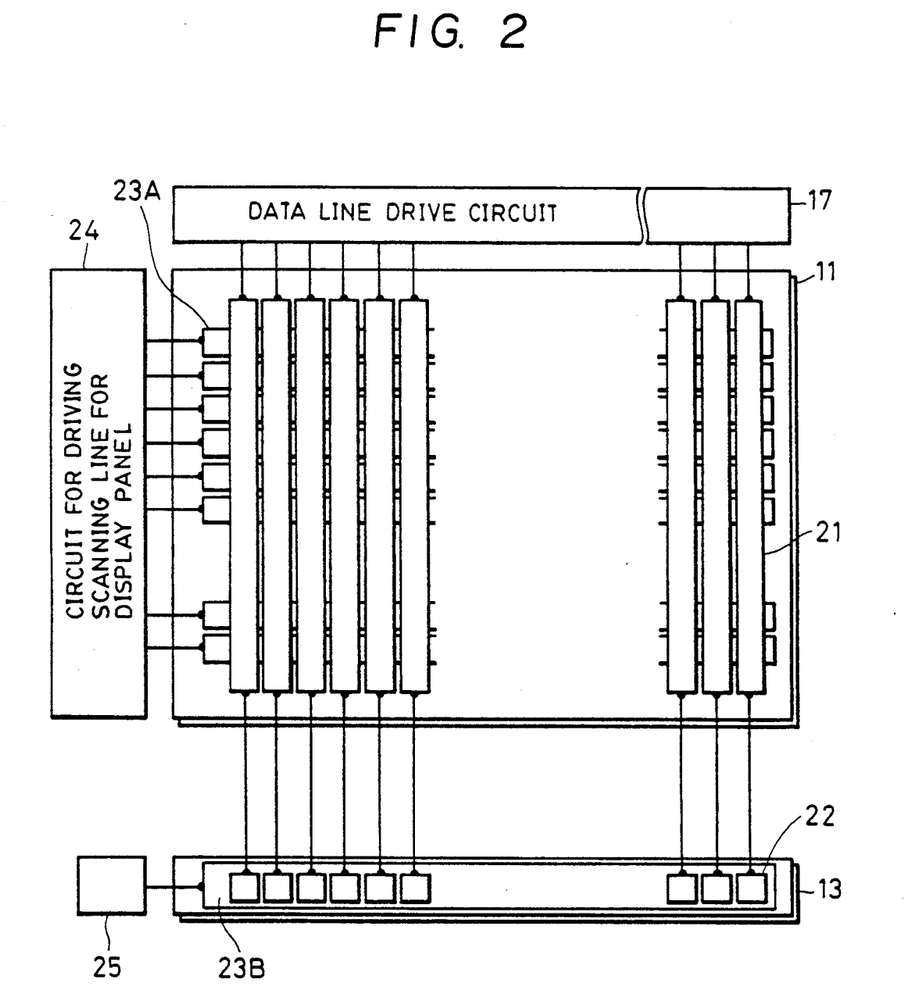
FIG. 2 is a block diagram of the device according to the present invention.

FIG. 2 is a view which illustrates the structure of the liquid crystal panel 11, the liquid crystal shutter array 13, and a drive portion disposed adjacent to those components. Data lines 21 disposed in the display portion are connected to corresponding data lines 22 of the shutter array 13 via a flexible cable (omitted from illustration), and are also connected to a common data-line drive circuit 17. A circuit 24 for driving the display panel scanning lines and a circuit 25 for driving the common line 23B for the shutter array 13 are respectively provided to serve as drive circuits for the scanning (common) lines 23A.

Both the display panel 11 and the shutter array 13 comprise ferroelectric liquid crystal (FLC) elements. Since FLC elements offer the advantages that: (1) high speed switching can be performed; and (2) memory characteristics are exhibited, they can be suitably used in large size displays and high speed printers. Furthermore, since as herein described, FLC elements are able to keep intact a display on the display panel even if the printer is being driven, they are the most desirable elements to be used in the device according to the present invention.

During a display, the scanning lines of the display portion 24 are successively selected, and a signal having a voltage corresponding to the displayed contents is applied to the data lines 21 in synchronization with the selected scanning lines so that the pictures to be displayed are formed. At this time, the same voltage to be applied to the non-selected scanning lines of the display portion 24 is applied to the common electrode 23b of the shutter array 13. This leads to the creation of a full dark state since strength of light transmission through the shutter does not change.

During operation of the printer, a non-selected voltage is applied to all of the scanning lines of the display portion 24, while a signal having the same voltage as that of the scanning selection signal and the scanning non-selection signal used during display is solely applied to the common electrode of the shutter array 13. A signal is applied to the data lines in synchronization with the movement of the photosensitive body so that the shutter is opened and closed. At this time, each of the picture elements of the display portion maintains its image since the degree of light transmission does not change.

Figure 3:
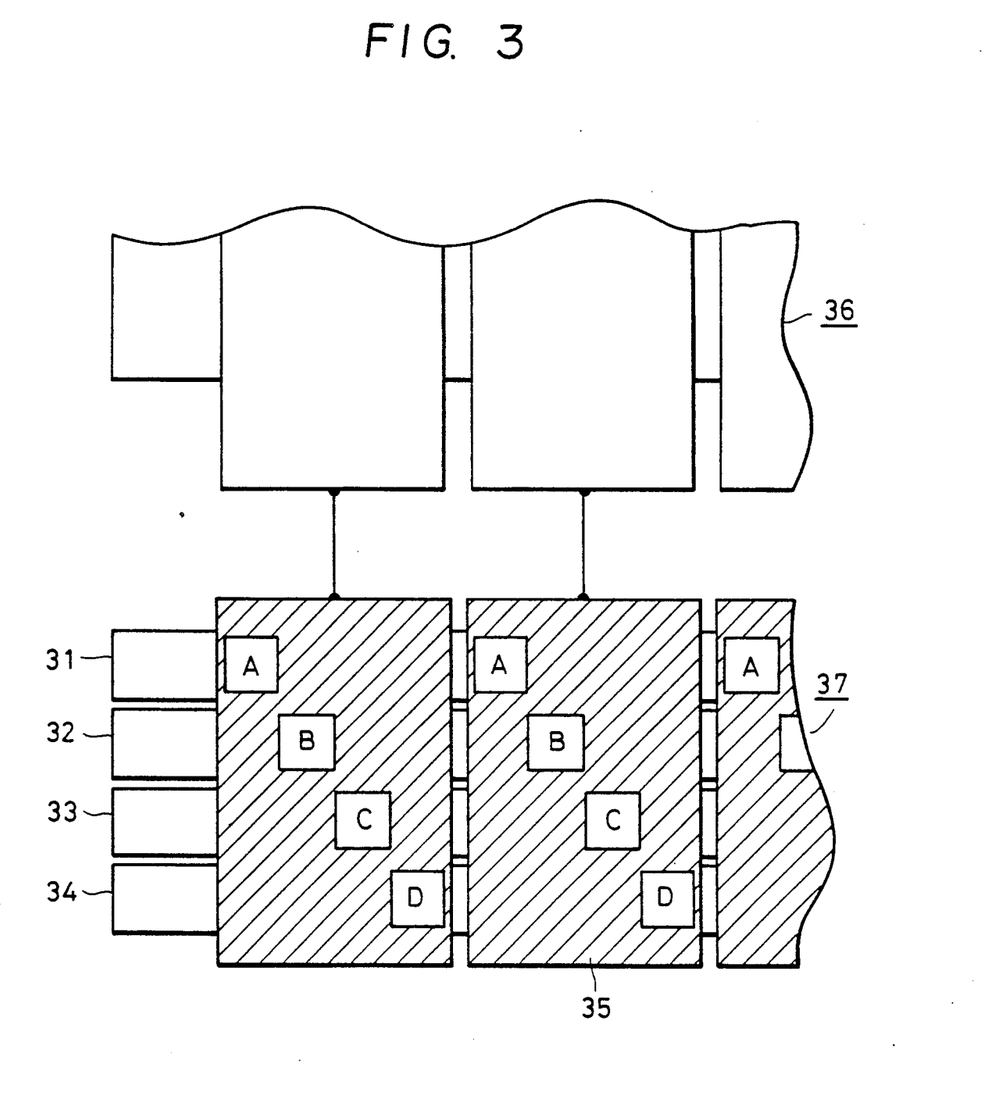
FIG. 3 is a plan view which illustrates a display portion and a matrix electrode portion of a printer portion of another embodiment of the present invention.

In the above-described embodiment, only one common line is provided in the printer portion, and the number of data lines in the display portion as it stands corresponds to the number of picture elements in the printer portion. However, in general, the usual density of the picture elements at the printer portion is several times as strong as that at the display portion. According to this embodiment, as shown in FIG. 3, the picture element density at the display portion 36 is arranged to be 4 pel/mm, while the same at the printer portion is arranged to be 16 pel/mm, which is realized by increasing the number of common lines of the printer portion to four. The common lines 31 to 34 are successively selected, and respectively applied with a selected voltage. In synchronization with this, a signal of each of the data lines changes four times so that the strength of light transmission through the shutters A to D is determined. Then, when the photosensitive body is moved by the distance corresponding to the width of a common line, the same operation is performed so that each of the shutters A to D is brought to a novel light transmission state. The above-described process is repeated. Light transmission through the other electrode intersections is prevented by a light shielding mask 35. With this system, even if the density of the picture elements in the printer portion 37 is raised, the number of the data lines does not change. Therefore, the number of data-line drive circuits does not change and thus the cost of the drive circuit can be reduced.

Figure 4:
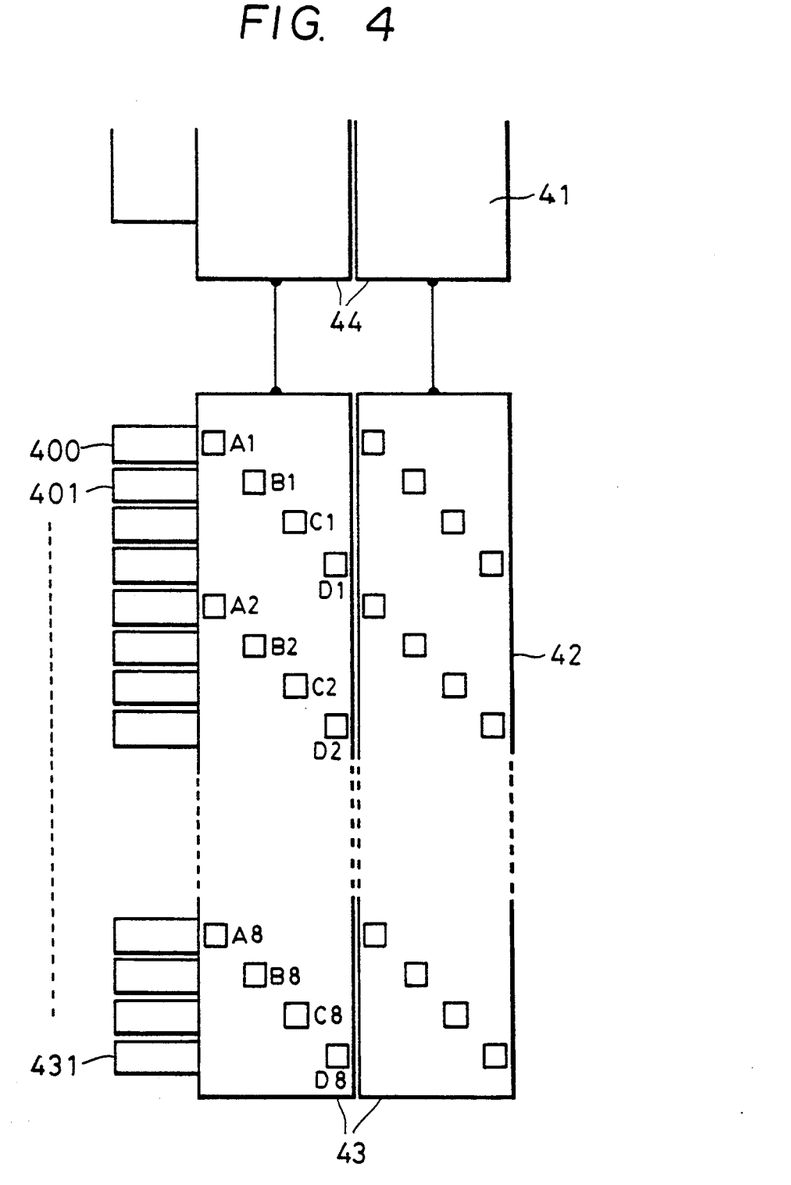
FIG. 4 is a plan view which illustrates a display portion and a matrix electrode portion of a printer portion of another embodiment of the present invention.
Figure 5A:
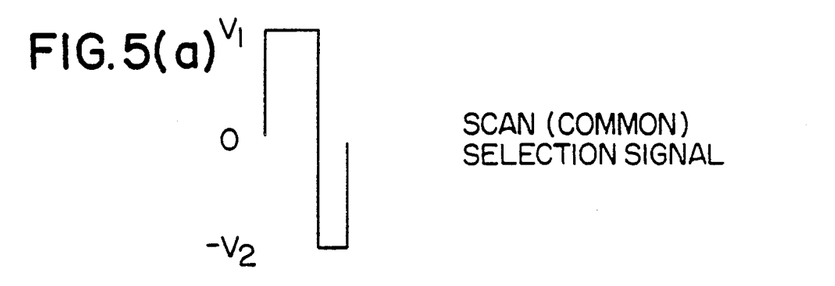
FIGS. 5(a)–5(d), 6(a)–6(d), and 7(a)–7(d) are views which illustrate waveforms employed as an example of the drive of the device according to the present invention.
Figure 5B:
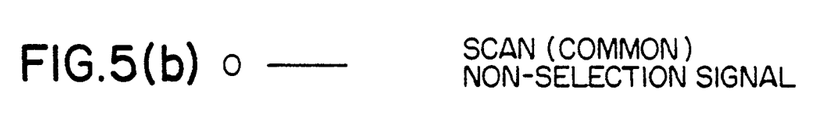
Figure 5C:
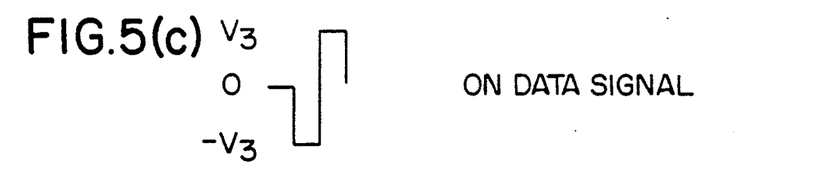
Figure 5D:
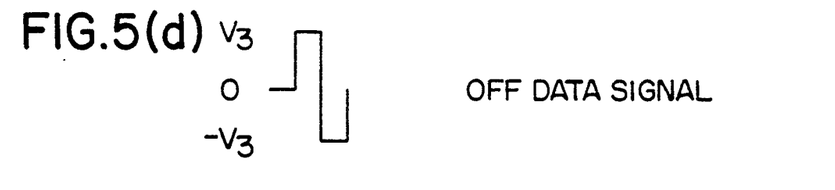
Figure 6A:
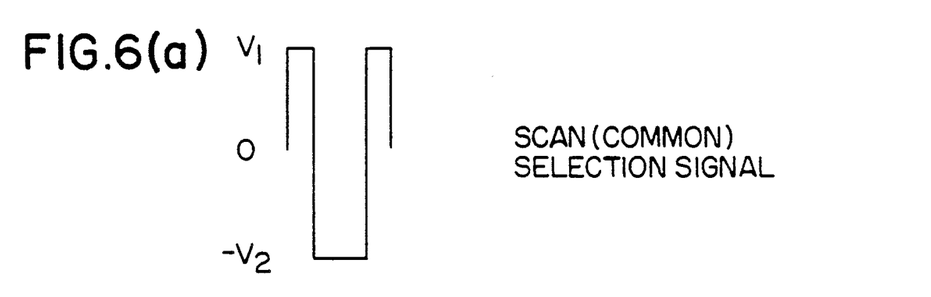
Figure 6B:
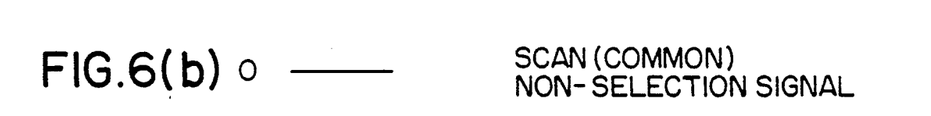
Figure 6C:
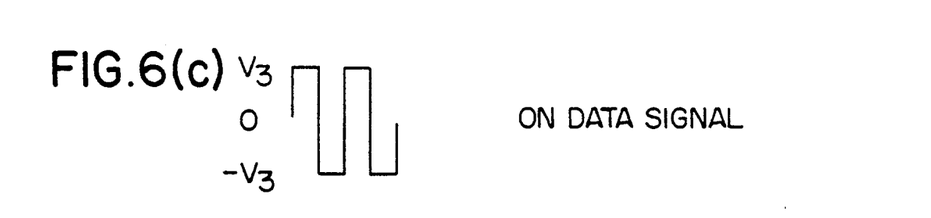
Figure 6D:
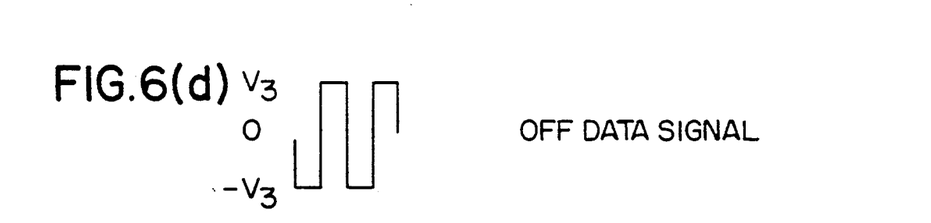
Figure 7A:
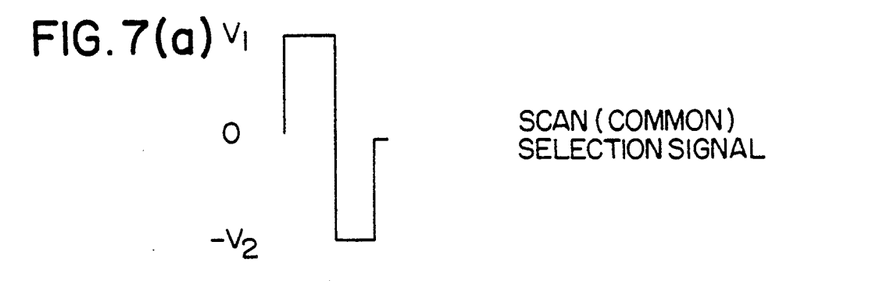
Figure 7B:
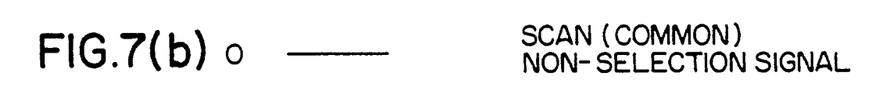
Figure 7C:
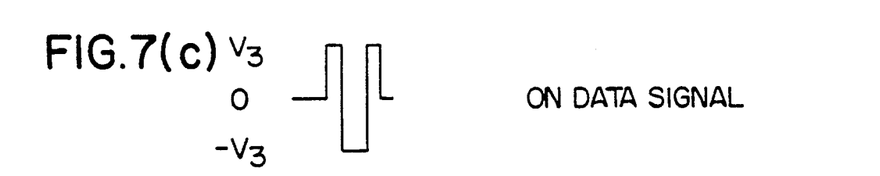
Figure 7D:
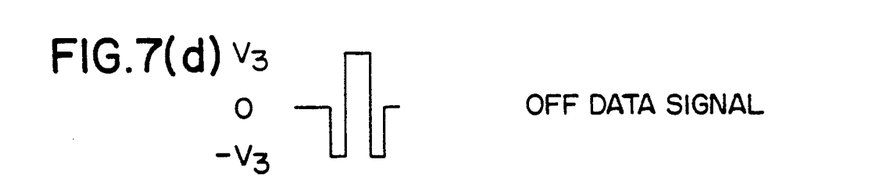

In the above-described two embodiments, each of the picture elements on the photosensitive body is exposed once to light by the shutter array. However, if the degree of light transmittance through the shutter is significantly reduced, or if the brightness of the light source is insufficient, optical energy of a sufficient level cannot be supplied to the photosensitive body during one exposure. In order to overcome this problem, a system in which the number of exposures is increased by arranging a plurality of shutters has been disclosed (see Japanese Patent Laid-Open No. 62-59921 and so on). The present invention is characterized in that the above-described system is applied to a device in which a display panel is integrally provided therein. FIG. 4 is a view which illustrates a structure designed as such.

As shown in FIG. 4, a shutter portion 42 is formed by making 32 common electrodes 400 to 431 and data electrodes of the same number as those in the display portion 41 intersect. Data lines 43 are individually connected to the corresponding data lines 44 of the display portion 41. The common electrodes 400 to 431 are divided into blocks each of which is formed by four common electrodes so that eight lines of the quarter time-division shutters A to D disposed in a zigzag manner are structured in the manner similar to the embodiment shown in FIG. 3. Whenever a picture element on the photosensitive body is positioned below the eight shutter-lines, the same is exposed to light. Then repeated until eight exposures are completed, a predetermined potential is obtained.

A method of driving the shutter portion 42 is arranged similarly to that employed in the embodiment shown in FIG. 3. The 32 common electrodes 400 to 431 are successively selected, and in synchronization with this, a signal is supplied to the data lines 43 so that light transmission states of $A_1$ to $D_1$, $A_2$ to $D_2$, ..., $A_8$ to $D_8$ are determined, respectively. This operation is repeated whenever the photosensitive body moves by the distance corresponding to the width of a common electrode.

Since the light transmission state of each of the picture elements of the display portion 41 does not change during the operation of the shutter portion 42, the display of the display panel can be kept intact.

In the above-described embodiments, the waveforms for driving the liquid crystal display panel portion and for the liquid crystal shutter array can be made the same. For example, a drive with waveforms shown in FIGS. 5 to 7 can be applied to both the liquid crystal display panel portion and the liquid crystal shutter array portion (referring to these drawings, symbols $V_1$, $V_2$ and $V_3$ represent the wave height). In addition, the liquid crystal display panel portion and the liquid crystal shutter array portion may be respectively driven by individual waveforms according to the present invention.

Figure 8:
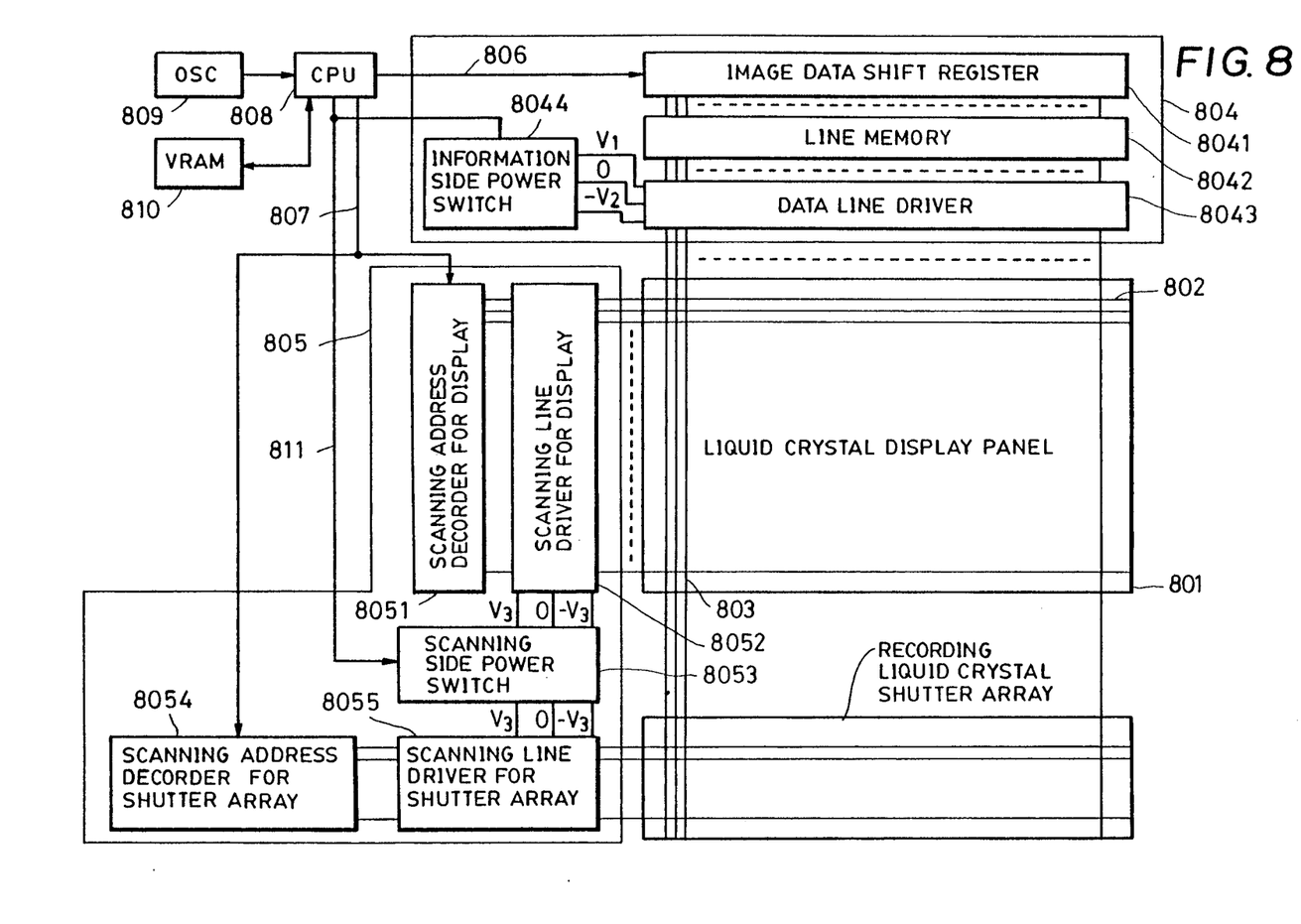
FIG. 8 is a block diagram of the display portion of the device according to the present invention.

FIG. 8 is a block diagram arranged to be employed in the liquid crystal display panel portion.

FIG. 8 is a view which illustrates an example of a display device according to the present invention. Reference numeral 801 represents a liquid crystal display panel comprising scanning lines 802, data lines 803, and ferroelectric liquid crystal enclosed therebetween. The orientation of the ferroelectric liquid crystal is controlled by an electric field created by the voltage applied to the electrodes at the intersections of the matrix defined by the scanning lines 802 and the data lines 803.

Reference numeral 804 represents a data-line drive circuit comprising: an image data shift register 8041 for storing serial image data supplied from the information signal line 806; a line memory 8042 for storing parallel image data supplied from the image data shift register 8041; a data-line driver 8043 for applying a voltage to the data lines 803 in accordance with image data stored by the line memory 8042; and an information-side power source switch 8044 for switching voltages $V_D$, 0 and $-V_D$ to be applied to the data lines 803 in response to a signal transmitted by a switch control line 811.

Reference numeral 805 represents a scanning-line drive circuit comprising: a display scanning decoder 8051 for assigning a scanning line from all of the scanning lines in response to a signal transmitted by a scanning address data line 807; a display scanning-line driver 8052 for applying a voltage to the scanning lines 802 in response to a signal transmitted by the decoder 8051; and a scanning-side power switch 8053 for switching voltages $V_3$, 0, and $-V_3$ to be applied to the scanning lines 802 in response to a signal transmitted by the switch control line 811. Reference numeral 8053 represents a scanning address decoder for a shutter array, and 8054 represents a scanning line driver for a shutter array.

Reference numeral 808 represents a CPU, which, in response to a clock pulse transmitted by an oscillator 809, controls an image memory 810 and signal transmission to an information signal line 806, the scanning address data line 807 and switch control line 811.

Figure 9:
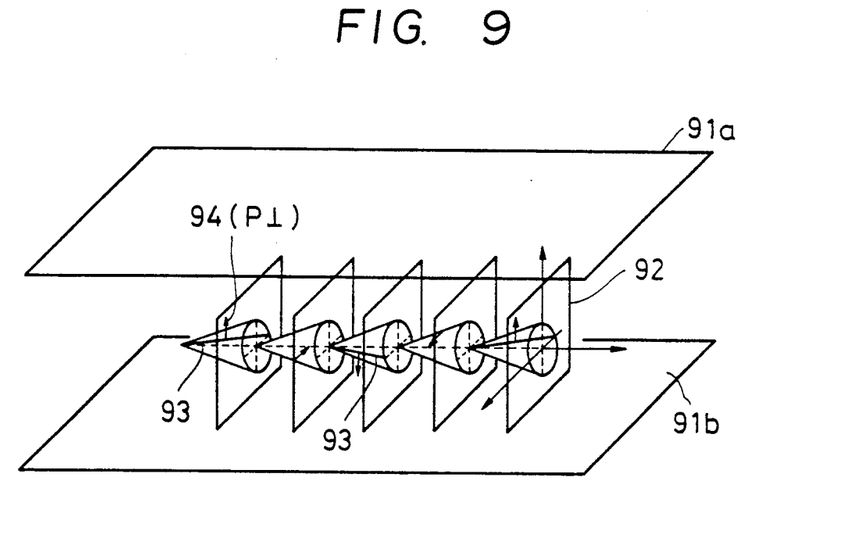
FIGS. 9 and 10 are perspective views which illustrate a ferroelectric liquid crystal cell used in the device according to the present invention.
Figure 10:
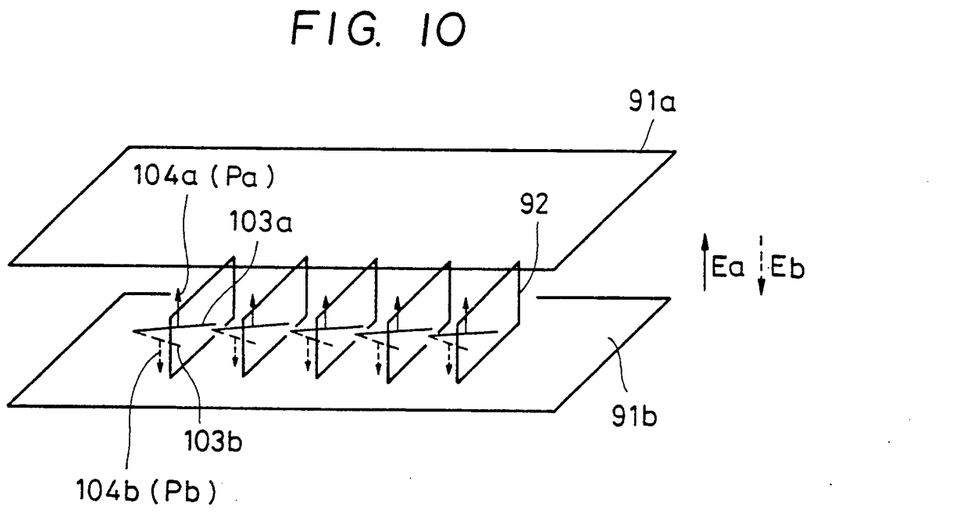

FIG. 9 is a view which schematically illustrates an example of a ferroelectric liquid crystal cell. Reference numerals 91a and 91b represent substrates (glass plates) each of which is coated with a transparent electrode made of $In_2O_3$, $SnO_2$ or ITO (Indium-Tin-Oxide). Liquid crystal of SmC*-phase is enclosed between these substrates 91a and 91b, this liquid crystal of SmC*-phase being oriented so as to have a liquid crystal molecular layer 92 arranged to be perpendicular to the surface of the substrates. A bold line 93 designates liquid crystal molecules each of which has a dipolar moment (P⊥) 94 in the direction perpendicular to the liquid crystal molecules 93. When a voltage with a threshold exceeding a predetermined level is applied between the electrodes on the substrates 91a and 91b, the spiral structures of the liquid crystal molecules 93 are untied so that the direction of orientation of the liquid crystal molecule 93 can be changed so as to make all of the dipole moments (P⊥) 94 face the electric field. The liquid crystal molecules are formed in the rectangular shape, and they display a refractive index anistropy between the major axes and the minor axes thereof. Therefore, it can be readily understood that the liquid crystal molecules 93 become liquid crystal optical modulating elements whose optical characteristics can be changed by the polarization of the applied voltage by, for example, disposing polarizers arranged to establish a crossnicol positional relationship between each other on both sides of the glass plate. Furthermore, when the thickness of the liquid crystal cell is reduced sufficiently (for example, 1 $\mu$), the spiral structures of the liquid crystal molecules are untied even if no electric field is, as shown in FIG. 10, applied, causing their dipole moment Pa or Pb to be faced upward (104a) or downward (104b). When an electric field Ea or Eb having a threshold exceeding a predetermined level and a reversed polarity is applied to such a cell for a predetermined period of time as shown in FIG. 10, the direction of the dipole moment is changed to upward 104a or downward 104b with respect to a vector representing the electric field Ea or Eb. In synchronization with this, the liquid crystal molecules are oriented to either a first stable state 103a or a second stable state 103b.

According to the present invention, ferroelectric liquid crystal can be used as the optical modulating element utilizing its electro-optical response effect. In particular, an element shown in FIG. 10 is suitable to be used in the present invention. The liquid crystal molecules of this element are oriented to the first stable state 103a when the electric field Ea is applied thereto. This state can be stably maintained even if the electric field is turned off. On the other hand, when an inverse electric field Eb is applied, the liquid crystal molecules are oriented to the second stable state 103b in which the direction realized in the first stable state 103b is changed. However, this state can be also maintained even if the electric field is turned off. The thus-obtained orientation state can be maintained so far as the electric field Ea does not exceed a predetermined threshold. In order to effectively realize such a quick response and dipole stability, it is preferable for the thickness of the cell to be reduced as possible. In general, it is arranged to be 0.5 $\mu$ to 20 $\mu$, preferably 1 $\mu$ to 5 $\mu$. As the above-described ferroelectric liquid crystal to be employed in the display portion and the liquid crystal shutter portion as the line recording head portion, chiral smectic phase C or phase H is used, the chiral smectic phase C or H being composed of the same components and displaying the same threshold characteristics with respect to an applied voltage in these portions.

Although FLC liquid crystal is used in the above-described embodiments, TN (Twisted Nematic) elements, can, of course, realize the similar function with the same structure. However, such TN elements cannot maintain the display content during operation of printers.

Although liquid crystal is used in the above-described embodiments, the present invention is not limited to it. The present invention can be applied to other elements, for example, to a combination of an LED display and an LED printer.

As described above, less expensive displays can be readily provided with a printer function, without the necessity of providing an additional circuit which drives the printer head portion, by commonly using the data lines.

What is claimed is:

1. A display comprising:
   a matrix type display panel having a first common line and a first data line intersecting to form a displaying picture element for displaying data when said first common line and said first data line are driven;
   a line recording head including a second common line and a second data line intersecting to form a printing picture element arranged along said second common line for recording the data when said second common line and said second data line are driven; and
   means for driving said first and second data lines with a common drive circuit.

2. A display according to claim 1, wherein said line recording head includes a shutter array which utilizes a liquid crystal with an electro-optical response effect.

3. A display according to claim 2, wherein said liquid crystal comprises ferroelectric liquid crystal.

4. A display according to claim 3, wherein said ferroelectric liquid crystal comprises chiral smectic liquid crystal.

5. A display according to claim 1, wherein liquid crystal is disposed between said first common line and said first data line.

6. A display according to claim 5, wherein said liquid crystal comprises ferroelectric liquid crystal.

7. A display according to claim 6, wherein said ferroelectric liquid crystal comprises chiral smectic liquid crystal.

8. A display comprising:
   a display panel for displaying data;
   a line recording head for recording the data;
   at least one matrix electrode having a plurality of scanning lines and data lines intersecting in a matrix manner and including (a) recording scanning lines comprising at least one of said plurality of scanning lines disposed on said line recording head, wherein the data is recorded by selectively driving said recording scanning lines and said data lines, and (b) display scanning lines comprising the remaining said scanning lines disposed on said display panel, wherein the data is displayed by selectively driving said display scanning lines and said data lines; and means for applying a scanning selection signal exclusively to one of said display scanning lines and said recording scanning lines to do one of display the data and record it.

9. A display according to claim 8, wherein liquid crystal is disposed between said plurality of scanning lines and data lines disposed on said display panel and said line recording head.

10. A display according to claim 9, wherein said liquid crystal comprises ferroelectric liquid crystal.

11. A display comprising:

a display panel for displaying data;

a line recording head for recording the data;

at least one matrix electrode having a plurality of scanning lines and data lines intersecting in a matrix manner and including (a) recording scanning lines comprising at least one of said plurality of scanning lines disposed on said line recording head, wherein the data is recorded by selectively driving said recording scanning lines and said data lines, and (b) display scanning lines comprising the remaining said scanning lines disposed on said display panel, wherein the data is displayed by selectively driving said display scanning lines and said data lines; and means for applying a first scanning selection signal at a selected waveform exclusively to said display scanning lines to display the data, and for applying a second scanning selection signal with the same waveform as the selected waveform to said recording scanning lines to record the data.

12. A display according to claim 11, wherein liquid crystal is disposed between said plurality of scanning lines and said data lines disposed on said display panel and said line recording head.

13. A display according to claim 12, wherein said liquid crystal comprises ferroelectric liquid crystal.

14. A display comprising:

a display panel for displaying data;

a line recording head for recording the data;

at least one matrix electrode having a plurality of scanning lines and data lines intersecting in a matrix manner and including (a) recording scanning lines comprising at least two scanning lines of said plurality of scanning lines disposed on said line recording head, wherein the data is recorded by selectively driving said recording scanning lines and said data lines, and (b) display scanning lines comprising the remaining said scanning lines disposed on said display panel, wherein the data is displayed by selectively driving said display scanning lines and said data lines; and means for applying a first scanning selection signal of a first selected waveform to selected display scanning lines, for applying a first scanning non-selection signal of a second selected waveform to the non-selected display scanning lines, and for applying a voltage with the same waveform as the second selected waveform to said recording scanning lines to display the data; and means for applying a second scanning selection signal with the same waveform as the first selected waveform to selected recording scanning lines, for applying a second scanning non-selection signal with the same waveform as the second selected waveform to the non-selected recording scanning lines, and for applying a voltage with the same waveform as the second selected waveform to said display scanning lines to record the data.

15. A display according to claim 14, wherein liquid crystal is disposed between said plurality of scanning lines and said data lines disposed on said display panel and said line recording head.

16. A display according to claim 15, wherein said liquid crystal comprises ferroelectric liquid crystal.

17. A display comprising:

a display panel for displaying data;

a line recording head for recording the data;

at least one matrix electrode having a plurality of scanning lines and data lines intersecting in a matrix manner and including (a) recording scanning lines comprising at least one of said plurality of scanning lines disposed on said line recording head, wherein the data is recorded by selectively driving said recording scanning lines and said data lines, and (b) display scanning lines comprising the remaining said scanning lines disposed on said display panel, wherein the data is displayed by selectively driving said display scanning lines and said data lines, said data lines to be used commonly by said recording and display scanning lines;

means for applying a scanning selection signal exclusively to one of said scanning lines and said recording scanning lines to do one of display the data and record it; and means for applying an information signal to said data lines during the displaying and recording of the data.

18. A display according to claim 17, wherein liquid crystal is disposed between said scanning lines and said data lines disposed in said display panel and said line recording head.

19. A display according to claim 18, wherein said liquid crystal comprises ferroelectric liquid crystal.

20. A display comprising:

a display panel for displaying data;

a line recording head for recording the data;

at least one matrix electrode having a plurality of scanning lines and data lines intersecting in a matrix manner and including (a) recording scanning lines comprising at least one of said plurality of scanning lines disposed on said line recording head, wherein the data is recorded by selectively driving said recording scanning lines and said data lines, and (b) display scanning lines comprising the remaining said scanning lines disposed on said display panel, wherein the data is displayed by selectively driving said display scanning lines and said data lines, said data lines to be used commonly by said recording and display scanning lines;

means for applying a first scanning selection signal of a selected waveform exclusively to said display scanning lines to display the data, and for applying a second scanning selection signal with the same waveform as the selected waveform exclusively to said recording scanning lines to record the data; and means for applying an information signal to said data lines during the displaying and recording of the data.

21. A display according to claim 20, wherein liquid crystal is disposed between the plurality of scanning lines and data lines disposed on said display panel and said line recording head.

22. A display according to claim 21, wherein said liquid crystal comprises ferroelectric liquid crystal.

23. A display comprising:
    a display panel for displaying data;
    a line recording head for recording the data;
    at least one matrix electrode having a plurality of scanning lines and data lines intersecting in a matrix manner and including (a) recording scanning lines comprising at least two scanning lines of said plurality of scanning lines disposed on said line recording head, wherein the data is recorded by selectively driving said recording scanning lines and said data lines, and (b) display scanning lines comprising the remaining said scanning lines disposed on said display panel, wherein the data is displayed by selectively driving said display scanning lines and said data lines, said data lines to be used commonly by said recording and display scanning lines;
    means for applying a first scanning selection signal of a first selected waveform to selected display scanning lines, for applying a first scanning non-selection signal of a second selected waveform to non-selected display scanning lines, and for applying a voltage with the same waveform as the second selected waveform to said recording scanning lines to display the data;
    means for applying a second scanning selection signal with the same waveform as the first selected waveform to selected recording scanning lines, for applying a second scanning non-selection signal with the same waveform as the second selected waveform to the non-selected recording scanning lines, and for applying a voltage with the same waveform as the second selected waveform to said display scanning lines to record the data; and
    means for applying an information signal to said data lines during the displaying and recording of the data.

24. A display according to claim 23, wherein liquid crystal is disposed between said plurality of scanning lines and said data lines disposed on said display panel and said line recording head.

25. A display according to claim 24, wherein said liquid crystal comprises ferroelectric liquid crystal.

26. A display comprising:
    a display panel for displaying data;
    a line recording head for recording the data;
    at least one matrix electrode having a plurality of scanning lines and data lines intersecting in a matrix manner and including (a) recording scanning lines comprising at least one of said plurality of scanning lines disposed on said line recording head, wherein the data is recorded by selectively driving said recording scanning lines and said data lines, and (b) display scanning lines comprising the remaining said scanning lines disposed on said display panel, wherein the data is displayed by selectively driving said display scanning lines and said data lines, said data lines to be used commonly by said recording and display scanning lines;
    a first element portion disposed between said recording scanning lines and data lines and containing a first material displaying threshold characteristics with respect to an applied voltage, and a second element portion disposed between said display scanning lines and data lines and containing a second material displaying substantially the same threshold characteristics as said threshold characteristics of said first material;
    means for applying a first scanning selection signal exclusively to one of said display scanning lines and said recording scanning lines to do one of display the data and record it; and
    means for applying an information signal to said data lines during the displaying and recording of the data.

27. A display according to claim 26, wherein said first material and said second material comprise liquid crystal of the same composition.

28. A display according to claim 27, wherein said liquid crystal comprises ferroelectric liquid crystal.

29. A display according to claim 27, wherein said liquid crystal comprises twisted nematic liquid crystal.

* * * * *

UNITED STATES PATENT AND TRADEMARK OFFICE
CERTIFICATE OF CORRECTION

PATENT NO. : 5,132,817
DATED : July 21, 1992
INVENTOR(S) : Yutaka Inaba

It is certified that error appears in the above-identified patent and that said Letters Patent is hereby corrected as shown below:

COLUMN 2:

Line 2, "on" should read --or--.

COLUMN 6:

Line 5, "1 $\mu$to 5 $\mu$." should read --1 $\mu$ to 5 $\mu$--.

COLUMN 8:

Line 68, "the" should read --said--.

Signed and Sealed this

Twenty-sixth Day of October, 1993

Attest:

BRUCE LEHMAN

Attesting Officer      Commissioner of Patents and Trademarks